United States Patent [19]
Nilsson et al.

[11] Patent Number: 5,043,996
[45] Date of Patent: Aug. 27, 1991

[54] MONLITHIC NONPLANAR RING OSCILLATOR AND METHOD

[75] Inventors: Alan C. Nilsson; Robert L. Byer, both of Stanford, Calif.

[73] Assignee: The Board of Trustees of the Leland Stanford Junior University, Stanford, Calif.

[21] Appl. No.: 332,232

[22] Filed: Mar. 31, 1989

[51] Int. Cl.$^5$ ............................................ H01S 3/083
[52] U.S. Cl. .................................................... 372/94
[58] Field of Search ............................. 372/98, 99, 94

[56] References Cited

U.S. PATENT DOCUMENTS

4,578,793  3/1986  Kane et al. ............................ 372/94
4,747,111  5/1988  Trutna et al. ......................... 372/94

Primary Examiner—William L. Sikes
Assistant Examiner—Robert E. Wise
Attorney, Agent, or Firm—Flehr, Hohbach, Test, Albritton & Herbert

[57] ABSTRACT

A monolithic nonplanar ring oscillator having an optically isotropic solid-state laser body for propagating laser radiation about a nonplanar ring path internal to the laser body is disclosed. The monolithic laser body is configured to produce a 2N reflection nonplanar ring light path, where N is an integer greater than or equal to 2, comprising $2N-1$ total internal reflections and one reflection at a coupler in a single round trip. Unidirectional traveling wave oscillation of the laser is induced by the geometry of the nonplanar ring path together with the effect of an applied magnetic field and partial polarizer characteristics of the oblique reflection from the coupler. The 6-reflection nonplanar ring oscillator makes possible otpimal unidirectional oscillation (low loss for the oscillating direction of propagation and, simultaneously high loss for the nonoscillating direction of propagation) in monolithic NPROs using materials with index of refraction smaller than the square root of 3, for example, laser glass.

26 Claims, 6 Drawing Sheets

MONLITHIC NONPLANAR RING OSCILLATOR AND METHOD

This invention was made with U.S. Government support under NASA Agreement No. NAG-1-839. The Government has certain rights in this invention.

This invention is related to the invention disclosed in U.S. Patent Application, Ser. No. 332,010, filed on Mar. 31, 1989 and filed concurrently herewith, entitled SINGLE FREQUENCY MONOLITHIC NONPLANAR RING LASER AND METHOD FOR DETERMINING SAME, invented by Edward C. Rea, Jr. and Alan C. Nilsson, which is hereby incorporated by reference.

BACKGROUND OF THE INVENTION

1. Field of the Invention. The present invention relates to monolithic solid-state lasers. More specifically, the present invention relates to monolithic nonplanar ring oscillators, also known as MISERs, in which the use of a nonplanar ring light path comprising six or eight reflections makes possible optimal unidirectional operation in optically isotropic laser media including low-index-of-refraction materials such as laser glasses as well as high-index-of-refraction laser crystals.

2. Summary of the Prior Art. The prior art has presented the advantages of end-pumped monolithic nonplanar ring oscillators (NPROs). In general, monolithic nonplanar ring oscillators can operate as unidirectional, single-frequency lasers in the presence of a sufficiently strong magnetic field. End-pumping of the monolithic NPRO provides an efficient means of exciting only the $TE_{00}$ mode of the laser, and end-pumping greatly reduces the thermal load on the laser. End-pumping with diode laser sources is particularly efficient. A monolithic laser has a rugged, mechanically stable resonator. Unidirectional oscillation in a ring laser overcomes the problem of spatial hole burning and allows the laser to operate in a single longitudinal mode, even at high output powers. Unidirectional operation of a ring laser also leads to improved resistance to optical feedback. An end-pumped, unidirectional, monolithic NPRO is thus an efficient source of narrow linewidth laser radiation with improved immunity to the deleterious effects of back-reflected radiation.

All devices of the prior art have used Nd:YAG or Nd:GGG as the laser medium. It is desirable to extend the concept of the monolithic NPRO to other media, especially laser glasses. There are several strong motivations for doing so, including improved injection locking of high-power pulsed glass laser systems, the engineering of laser resonators with extremely low quantum linewidth limits, and the potential of developing monolithic resonators with small thermo-optic coefficients. Any glass-based system requiring a narrow linewidth stable oscillator would benefit from the development of a monolithic NPRO in laser glass.

There are also considerable practical advantages to using laser glass for making monolithic NPROs. First, the optical quality of laser glass is superior to that of most crystalline materials. Second, the cost of high quality laser glass is small compared to that of high quality laser crystals. Third, the manufacturing techniques developed for use with glass cannot usually be applied to crystalline media. These practical and physical considerations make the development of a design algorithm for monolithic NPROs constructed from media of widely varying indices of refraction extremely important.

U.S. Pat. No. 4,578,793, issued Mar. 25, 1986 to Kane and Bver, entitled Solid-State Non-Planar Internally Reflecting Ring Laser, describes the requirements for unidirectional oscillation in a monolithic nonplanar ring oscillator. The fundamental requirement is an adequate loss difference between the two possible directions of propagation around the ring. The laser will operate unidirectionally in the direction of lower loss when the loss difference is sufficiently large. To produce a difference between the round trip losses of the two directions of propagation requires an optical diode. The three essential elements required to form an optical diode are: 1) a reciprocal (propagation-direction-independent) polarization effect, 2) a nonreciprocal (propagation-direction-dependent) polarization effect, and 3) a partial polarizer.

Discrete-element Faraday effect optical diodes have long been used to enforce stable unidirectional operation of solid-state, He-Ne, and ring dye lasers. The optical diode creates a polarization-dependent difference in loss for the eigenmodes of the two directions of propagation around a ring. The loss difference is produced by a combination of a reciprocal polarization rotator such as c-axis quartz, a nonreciprocal rotator such as a Faraday rotator, and a polarizer. Ideally, one arranges the reciprocal and nonreciprocal rotations to cancel for one direction of propagation and to add for the other. In the direction in which the rotations cancel, the eigenpolarizations are the low and high loss linear polarization states aligned with the principal axes of the partial polarizer. For the direction in which the rotations add, the eigenpolarizations are in general linear or elliptical polarization states with losses intermediate between the maximum and minimum possible values. An optical diode having these properties is said to be optimal.

Kane and Bver describe a means of producing an optical diode in a monolithic nonplanar ring oscillator. The elements of the optical diode are as follows. The reciprocal polarization-influencing effect is provided by a nonplanar ring light path defined by three total internal reflections (TIRs) and one reflection from a multilayer dielectric coated output coupler. The nonreciprocal effect is provided by Faraday rotation in the laser medium when tha laser resonator is immersed in an applied magnetic field. Oblique reflection from the output coupler implies that the s and p reflection coefficients for the output coupler are different, so·the output coupler functions as a partial polarizer.

Figure 1A:
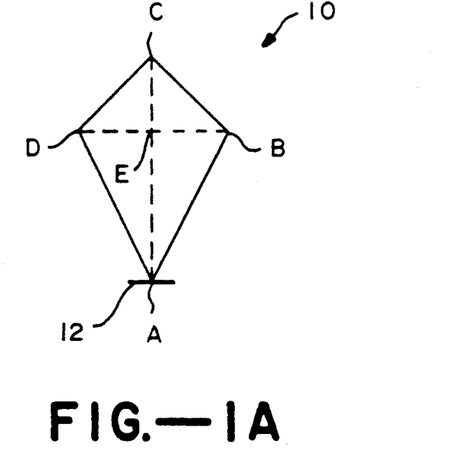
FIG. 1a is a top view of the non-planar ring light path of the four reflection NPRO of the prior art.
Figure 1B:
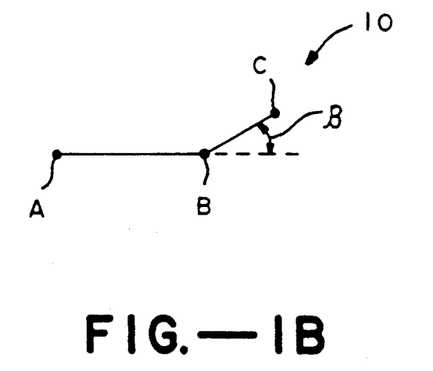
FIG. 1b is a side view of the nonplanar ring light path of the four reflection NPRO of the prior art.
Figure 1C:
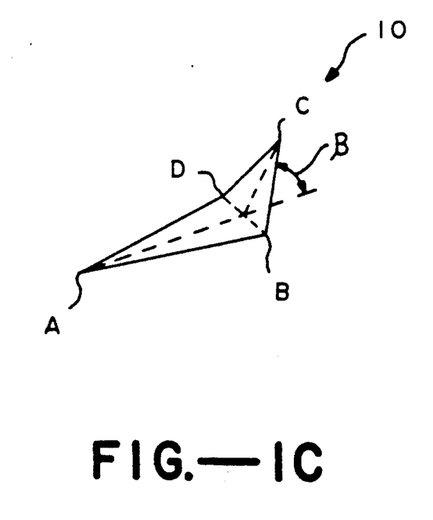
FIG. 1c is a perspective view of the nonplanar ring light path of the four reflection NPRO of the prior art.

Referring to FIG. 1a-c, a schematic of the nonplanar ring light path for a prior art four-reflection NPRO 10 is shown. The light path is the perimeter of a three-dimensional geometric figure formed by joining two isosceles triangles (ABD and BCD) along a common base (BD). The dihedral angle between the two planes of the triangles is denoted by $\beta$ (FIG. 1b) For any value of $\beta$ other than 0 or 180 degrees, the light path is nonplanar. The light path has a plane of reflection symmetry (ACE). A uniform magnetic field B is applied, preferably parallel to AE.

The preferred embodiment of Kane and Bver involved a nonplanar ring light path in Nd:YAG in which the two planes of propagation (planes ABD and BCD in FIG. 1) of the light meet at right angles ($\beta = 90$ degrees). Trutna et al., in U.S. Pat. No. 4,747,111 for a Quasi-Planar Monolithic Unidirectional Ring Laser has shown that a significant advantage accrues from a change in the geometry of the light path. In the preferred embodiment of Trutna et al. the two planes of propagation of the light in Nd:YAG meet at an angle of $\beta = 1.25$ degrees instead of 90 degrees. The advantage of this geometry is that the associated optical diode is more closely analogous to the ideal discrete-element optical diode described previously. The loss associated with the low-loss direction of propagation can be made as small as is permitted by the choice of the output coupler 12. Moreover, the loss difference between the two directions of propagation for similar-sized Nd:YAG NPROs in the presence of a given applied magnetic field is much larger for the quasi-planar case than for the right-angle case. In other words, the quasi planar design permits unidirectional oscillation to be induced by a much smaller magnetic field than for the right-angle geometry.

As noted earlier, prior art devices have used high-index-of-refraction, crystalline laser materials such as Nd:YAG (n=1.82) or Nd:GGG (n=1.94) as the medium for their monolithic resonator. All devices of the prior art have used four-reflection nonplanar ring light paths comprising three TIRs and the reflection from the output coupler. Some of the relative advantages of different geometries for the nonplanar ring light path in Nd:YAG NPROs have been considered. It has been shown that significant advantages accrue to devices in which the combination of the geometry of the light path and the applied magnetic field lead to an optical diode that best emulates the ideal discrete-element optical diode in producing a low loss for the oscillating direction and a high loss for the non-oscillating direction.

The prior art descriptions of diode-laser-pumped monolithic glass lasers have, additionally, envisioned a four-reflection monolithic Nd:Glass NPRO with right-angle light path geometry. It is illustrated by implication of the analysis herein that such an NPRO cannot operate optimally as envisioned. Moreover, it has been experimentally shown that four-reflection, monolithic Nd:glass NPROs fail to run unidirectionally, even using stronger magnetic fields than those employed successfully with Nd:YAG NPROs. These experimental results underscore the importance of paying careful attention to the optical diode properties of the monolithic NPRO.

OBJECTS AND SUMMARY OF THE INVENTION

It is the object of the present invention to provide unidirectional operation of monolithic NPROs made from optically isotropic, low index of refraction laser materials (materials having refractive index smaller than $\sqrt{3}$ at the laser wavelength) such as laser glass.

It is another object of the present invention to provide optimal unidirectional operation of a monolithic NPRO in any optically isotropic laser material, where "optimal unidirectional operation" means that the laser will oscillate unidirectionally in its lowest loss polarization state while simultaneously maintaining large differential loss between the two directions of propagation around the nonplanar ring light path.

It is another object of the present invention to overcome the astigmatism limitations associated with optimal operation of four-reflection monolithic NPROs in materials with indices of refraction greater than $\sqrt{3}$.

It is another object of the present invention to provide a monolithic NPRO that operates unidirectionally with a relatively low applied magnetic field compared to that of the prior art.

It is still another object of the present invention to demonstrate how to make unidirectional operation of a CW, diode-laser-pumped, monolithic Nd:Glass NPRO possible. Typical laser glasses have indices of refraction in the vicinity of 1.5, well below the $\sqrt{3}$ cut-off for the possible existence of optimal four-reflection NPROs.

The present invention discloses a monolithic NPRO in which the nonplanar ring light path is defined by six or eight (or in general an even number greater than 4) reflections instead of the four reflections used in the prior art. Although not limited to total internal reflections, for purposes of illustration, the following is restricted to monolithic NPROs in which all but one of the reflections defining the nonplanar ring light path are total internal reflections from uncoated surfaces. The one remaining reflection is a reflection from a multi-layer dielectric coated mirror that serves as the output coupler. The six-reflection monolithic NPRO permits optimal unidirectional operation for all currently available laser glasses. The eight-reflection monolithic NPRO extends the possibility of optimal unidirectional operation to media with still lower indices of refraction, or alternatively permits the higher-index monolithic NPROs to perform optimally in an ambient medium with an index of refraction greater than one.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 6b is a side view of the NPRO of FIG. 6a.

FIG. 6c is a side view of an alternative preferred embodiment of the six reflection NPRO of FIG. 6a.

FIG. 6d is a side view of another alternative preferred embodiment of the six reflection NPRO of FIG. 6a.

FIG. 7b illustrates a side view of the six reflection NPRO of FIG. 7a.

FIG. 8b illustrates a side view of the six reflection NPRO of FIG. 8a.

FIG. 9b is a side view of a monolithic NPRO device of FIG. 9a.

FIG. 10b is a side view of the monolithic NPRO device of FIG. 10a.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Referring to FIG. 1, in four-reflection monolithic NPRO devices unidirectional oscillation will occur in above-threshold operation provided that the differential loss between the two directions of propagation around the ring light path is sufficiently large to overcome coupling between these two directions owing to scatter and back-reflections. The differential loss is provided by the combined polarization effects of total internal reflections involved in the nonplanar ring light path, the Faraday rotation caused by the applied magnetic field, and the partial polarizer characteristics associated with oblique reflection from the multilayer dielectric coated output coupler.

Independent of the number of reflections defining the nonplanar ring light path, an optimally designed monolithic NPRO device should have the following characteristics:

1. it operates unidirectionally;
2. it oscillates in the lowest loss polarization state for the chosen output coupler;
3. the differential loss between the oscillating and non-oscillating directions of propagation around the ring should be as large as possible, subject to the constraint (2) above.

A monolithic NPRO satisfying all three of these criteria is said to have an optimal optical diode. Analysis of the conditions under which these three criteria can be satisfied have led to the present invention. An overview of how the present invention relates to prior art disclosures is as follows. The patent and devices of Kane and Bver satisfy condition 1 in providing unidirectional operation using a four-reflection light path with a right-angle light path geometry. The devices have been demonstrated in Nd:YAG and Nd:GGG. The device of Trutna sought to satisfy criteria 2 and 3 by introducing a quasi-planar, four-reflection nonplanar ring light path in Nd:YAG, but shortcomings in the analysis led to the need to compromise between minimizing output coupling and maximizing differential loss. It is shown herein how to achieve optimally designed (in the sense of satisfying all three criteria above) monolithic NPROs in any optically isotropic medium. This analysis has led to the discovery that optimal four-reflection designs comprising 3 TIRS do not exist for materials with indices of refraction smaller than root 3. There do exist optimal six-reflection and eight-reflection designs for all currently useful optically isotropic laser materials, including laser glasses. In the course of this analysis arbitrary indices of refraction are considered for optically isotropic laser media. Also analyzed is under what conditions the optical diode can be made optimal in a four-reflection monolithic NPRO. It is shown that four-reflection monolithic NPROs with optimal optical diodes can exist only for those media with an index of refraction exceeding at least $\sqrt{3}(=1.7321)$. Also shown is a set of constraints relating the index of refraction of the laser medium to the allowable angle of incidence at the output coupler.

Figure 2A:
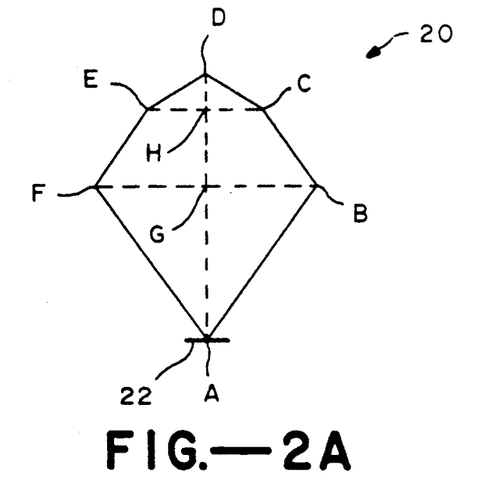
FIG. 2a is a top view of the nonplanar ring light path of the six reflection NPRO of the preferred embodiment.
Figure 2B:
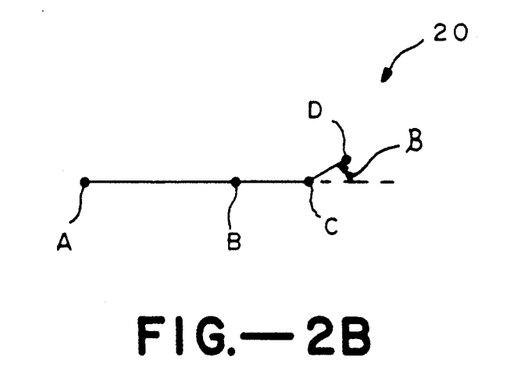
FIG. 2b is a side view of the nonplanar ring light path of the six reflection NPRO of the preferred embodiment.
Figure 2C:
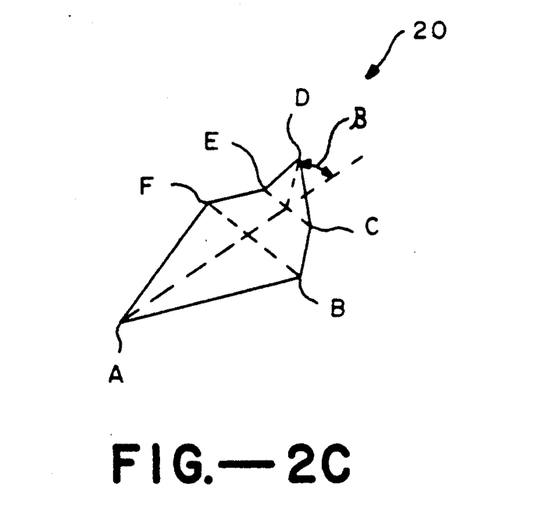
FIG. 2c is a perspective view of the nonplanar ring light path of the six reflection NPRO of the preferred embodiment.
Figures 3A, 3B, 3C, 5A, 5B:
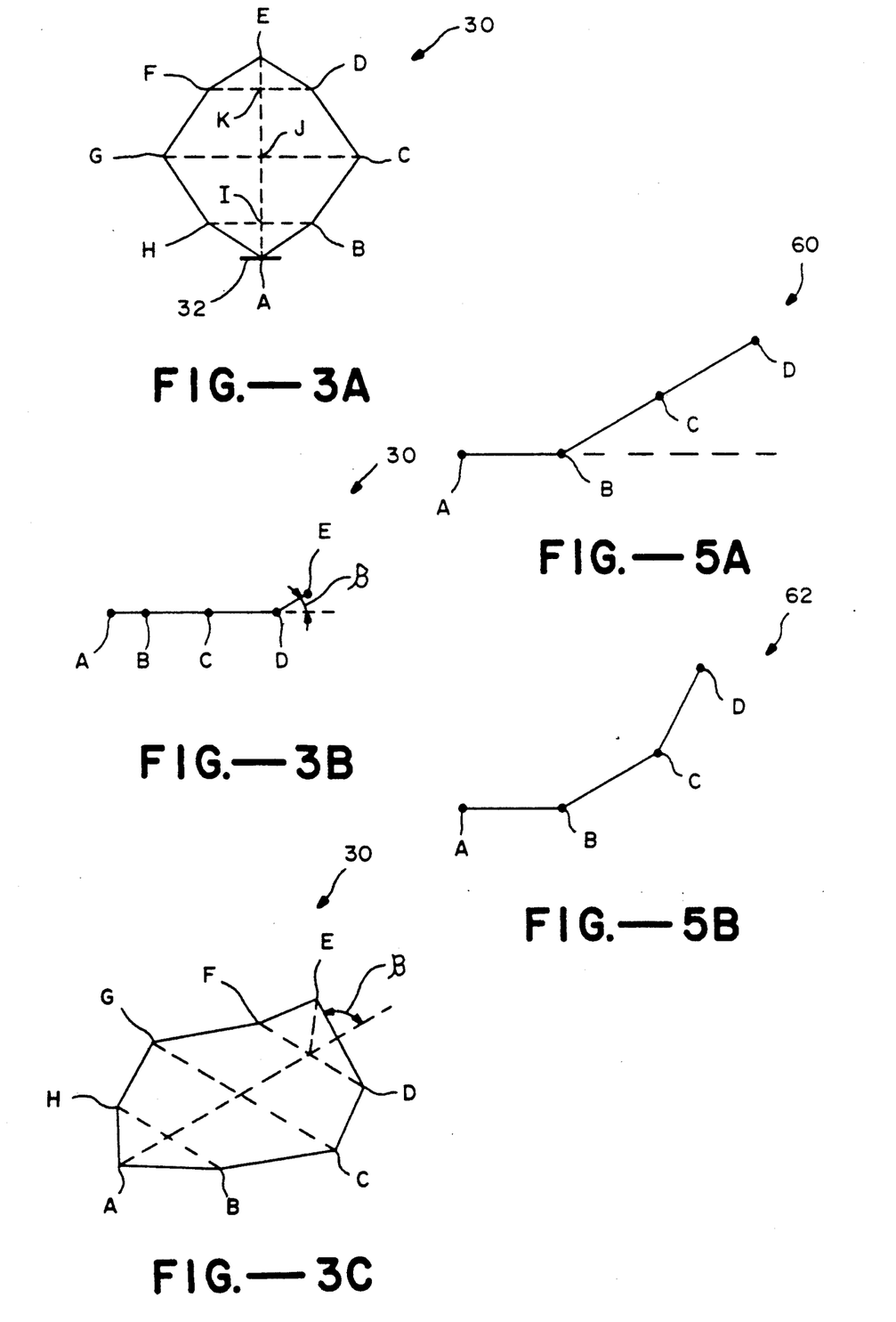
FIG. 3a is a top view of the nonplanar ring light path of the eight reflection NPRO of the preferred embodiment.
FIG. 3b is a side view of the nonplanar ring light path of the eight reflection NPRO of the preferred embodiment.
FIG. 3c is a perspective view of the nonplanar ring light path of the eight reflection NPRO of the preferred embodiment.
FIG. 5a is a side view of an alternative preferred embodiment for the six reflection NPRO.
FIG. 5b is a side view of another alternative preferred embodiment of the six reflection NPRO.

Referring to FIGS. 2 and 3, the present invention distills these principles and describes their application to monolithic NPROs in which the nonplanar ring light path contains an even number of reflections, and in particular the cases of six-reflection and eight-reflection NPROs. Consider a 2N-reflection NPRO, where N is an integer greater than or equal to 2. Initially, consideration is made of the case in which all but one of the reflections are total internal reflections, and the remaining reflection occurs at the multilayer dielectric coated output coupler 22 and 32. Assume that the geometry of the light path is such that all of the reflection vertices are coplanar except for one. Further, assume that the light path has a plane of mirror symmetry that contains the output coupling vertex and the out-of-plane vertex. Examples of such geometries are shown in FIGS. 1, 2 and 3 for four-reflection, six-reflection, and eight-reflection nonplanar ring light paths, respectively.

For monolithic NPROs with such nonplanar ring light paths, it can be shown that for a given direction of propagation around the ring the polarization-influencing effects of all of the total internal reflections, Faraday rotations, and rotations associated with the nonplanar geometry are optically equivalent to the effect of a single waveplate whose principal axes are rotated by some angle with respect to those of an output coupler 22 and 32. Each NPRO has an output coupler 22 and 32 to permit output coupling of the laser radiation and input coupling of the pump laser light. These output couplers are identified by their location as 22 and 32 in FIGS. 2a and 3a, respectively, and are discussed in more detail below. The output couplers themselves are optically equivalent to a waveplate and a partial polarizer with aligned principal axes. Thus, the monolithic NPRO resonator is optically equivalent to two separate optical systems (one for each direction of propagation around the ring) consisting of a waveplate with its principal axes rotated by some angle with respect to the principal axes of the output coupler.

Figure 4A:
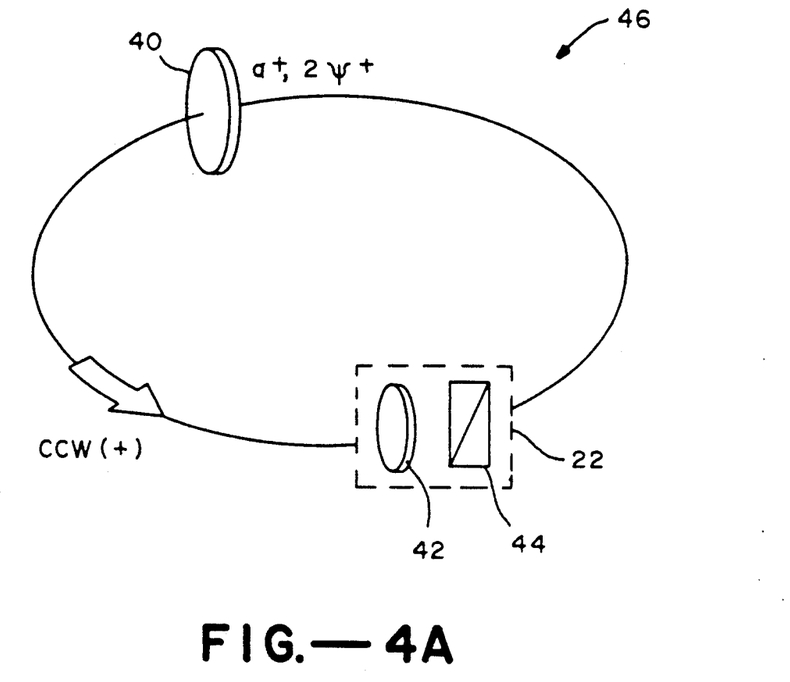
FIG. 4a illustrates an optically equivalent polarization system corresponding to counter-clockwise propagation in a monolithic NPRO.
Figure 4B:
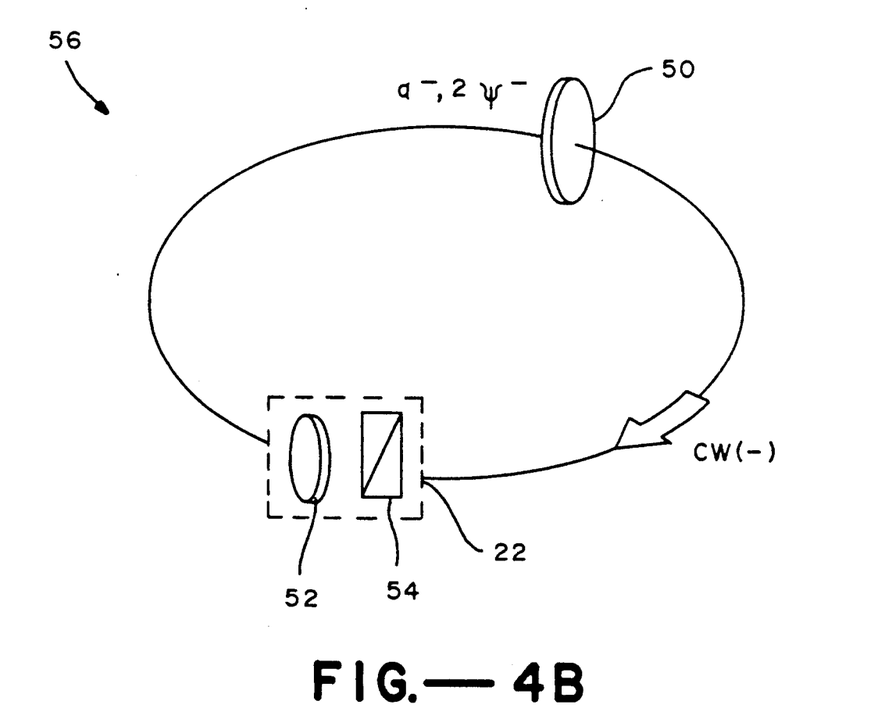
FIG. 4b illustrates an optically equivalent polarization system corresponding to clockwise propagation in a monolithic NPRO.
Figure 6A:
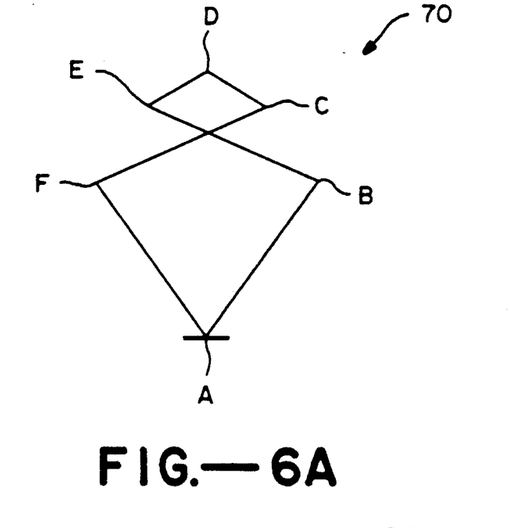
FIG. 6a is a top view of an alternative preferred embodiment for an six reflection NPRO.
Figure 6B:
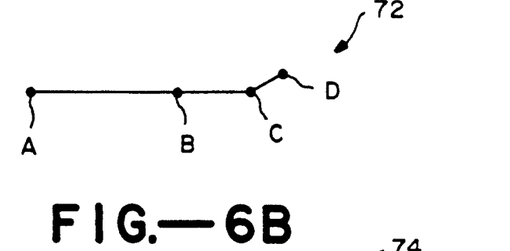
Figure 6C:
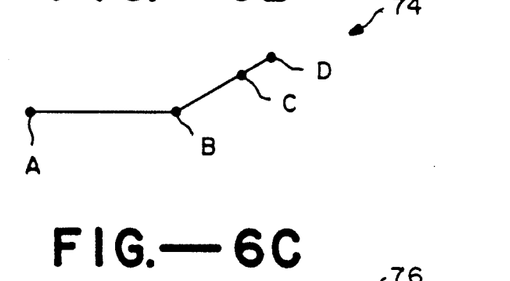
Figure 6D:
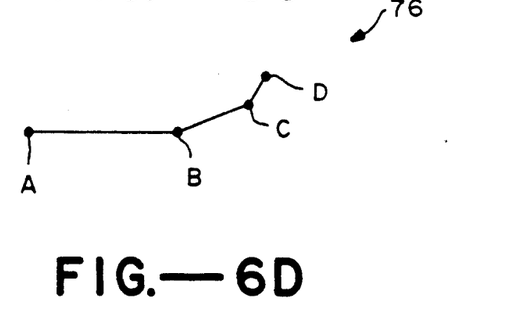

This relationship is demonstrated schematically in FIG. 4a and 4b where two resonators 46 and 56 that are optically equivalent to the monolithic NPRO for the two directions of propagation are illustrated. In this Figure the retardance of the output coupler is taken to be 180°, a highly preferred case, so the output coupler is shown as optically equivalent to a halfwave plate and a partial polarizer. In general the retardance of the output coupler need not be 180°.

Referring to FIG. 4a, an algorithm to produce optimal unidirectional operation in the counterclockwise (CCW) direction is as follows. Independent of the retardance $2\tau^+$ of the CCW optical equivalent waveplate 40, a CCW equivalent waveplate 40 is chosen such tha its principal axes are aligned with those of the output coupler 22, i.e., $\alpha^+ = 0$, thereby assuring that the lowest loss polarization state of the resonator will in fact be the operating polarization state for the CCW direction. Referring to FIG. 4b, a retardance $2\tau^-$ and orientation angle $\alpha^-$ are then chosen for the clockwise (CW) waveplate 50 to maximize the losses of the two possible polarization states for the CW direction. The retardances and orientation angles of the CCW and CW optically equivalent waveplates are complicated, coupled functions of the retardances of the total internal reflections, the dihedral angles between successive planes of incidence, and the Faraday rotations occurring in each segment of the light path. Since the equivalent waveplates 40 and 50 for the two directions of propagation are not independent, a constrained optimization problem is presented which must be solved.

It should be appreciated that the optimal-optical-diode solutions occur for those light path geometries that produce a retardance for the CW optically equivalent waveplate 50 such that the sum of the retardance of the CW waveplate 50 and the retardance associated with the reflection from the output coupler is a integer multiple of 360 degrees. For the highly preferred case in which the multilayer dielectric mirror is coated with a quarter-wave stack (each thin film layer has a quarter-wave optical thickness at the given angle of incidence and laser wavelength), the problem is simplified. In that case the retardance of the output coupler is 180 degrees, and the optimal-optical-diode solutions occur for light path geometries that make the CW equivalent waveplate 50 a half-waveplate.

It is desirable that the output coupler be optically equivalent to a half-waveplate 42 and 52 and a partial polarizer 44 and 54. From the equations relating the relative phase shifts associated with each total internal reflection to the retardance of the equivalent waveplate for CW propagation the constraint equation cannot be satisfied unless the sum of the relative phase shifts occurring at the total internal reflections slightly exceeds 180 degrees. This result thus provides us with a necessary (but not sufficient) condition for the existence of an optimal optical diode in a monolithic NPRO. That is, the sum of the relative phase shifts of the total internal reflections must be at least 180 degrees. From this condition a necessary further condition on the allowable index of refraction in terms of the number of internal reflections in a round trip through the resonator is derived.

The restriction arises from the existence of a maximum retardance for a total internal reflection (TIR) for a given index of refraction:

$$\tan\left(\frac{\Delta_{max}}{2}\right) = \frac{n^2 - 1}{2n}.$$

Considering a four-reflection monolithic NPRO, if a geometry is chosen for the nonplanar ring light path such that each of the TIRs produces the maximum possible retardance determined by the given index of refraction, then the sum of the TIR retardances has been maximized. If this sum is set equal to 180 degrees, the resulting equation can be solved for the smallest index of refraction that can yield a TIR retardance sum of 180 degrees in three TIRs. The result is $n_{min} = \sqrt{3}$.

The result can then be generalized to consider monolithic NPROs with more than three total internal reflections. The general result for the minimum index of refraction that leads to a TIR retardance sum of 180 degrees in M TIRs is $$n_{min} = \tan(90/M) + \sqrt{(1 + \tan^2(90/M))}.$$

Furthermore, it can be shown that the total number of reflections in a monolithic NPRO should be an even number in order to achieve optimal operation. Therefore, once it has been shown that four-reflection NPROs do not admit optimal optical diodes for any medium with index of refraction smaller than $\sqrt{3}$, the next preferred choices are six-reflection and eight-reflection NPROs. The lower limit on the index of refraction that is imposed by the TIR retardance sum requirement for a six-reflection NPRO is $n_{min}$(six-reflection NPRO) = 1.3764, and for the eight-reflection NPRO the result is $n_{min}$(eight-reflection NPRO) = 1.2540. These numbers pertain to the case in which the ambient medium surrounding the monolithic NPRO has an index of refraction of 1.0. In general these numbers represent the limits on the relative indices of refraction of the laser medium and the ambient medium.

Constraints on the geometries for the nonplanar ring light paths

Implicit in the statement that the TIR retardance sum for the nonplanar ring light path be at least 180 degrees is the constraint that TIR must actually occur at all of the reflections other than the output coupler 22, which means that each angle of incidence other than the angle of incidence at the output coupler must exceed the critical angle determined by the index of refraction of the laser medium through the expression $\sin(\theta_{critical}) = 1/n$. It is also implicit that the angle of incidence at the output coupler must not exceed the critical angle, because there will be no output if total internal reflection occurs at the output coupler. These implicit requirements, taken together with the sum rules for the internal angles of a closed polygon, determine the actual limits on permissible indices of refraction for a 2N-reflection monolithic NPRO. Optimal optical diode solutions can be found employing the six-reflection (and therefore also the eight-reflection) nonplanar ring light paths for all of the currently employed laser media, including the laser glasses having indices of refraction greater than ~1.5.

There is a trade-off associated with the choice of the number of TIRs in a round trip in a monolithic NPRO. In general there is a small amount of loss and scatter associated with each reflection. Therefore, to keep the round trip losses minimal, the nonplanar ring light path with the smallest number of reflections is chosen. On the other hand, for a given index of refraction and a given number of reflections defining the ring, there is a lower bound on the angle of incidence at the output coupler that can still lead to optimal optical diode solutions. Assuming that, as in prior art, the output coupler is a spherical surface, there is astigmatism associated with non-normal reflection from the output coupler, and the astigmatism worsens as the angle of incidence gets larger. Keeping the index of refraction fixed and increasing the number of reflections in the nonplanar ring light path reduces the lower bound on the angle of incidence at the output coupler, so a monolithic NPRO with more reflections admits optimal optical diode solutions with reduced astigmatism. The trade-off involves the relative importance of astigmatism and increased loss and scatter. Given a material with an index of refraction too small to admit optimal design with a four-reflection geometry, the next choice should be a six-reflection geometry unless the astigmatism associated with the six-reflection geometry is intolerable. As noted previously there are optimal solutions involving six-reflection nonplanar ring light paths for all of the technically important laser media.

Figure 9A:
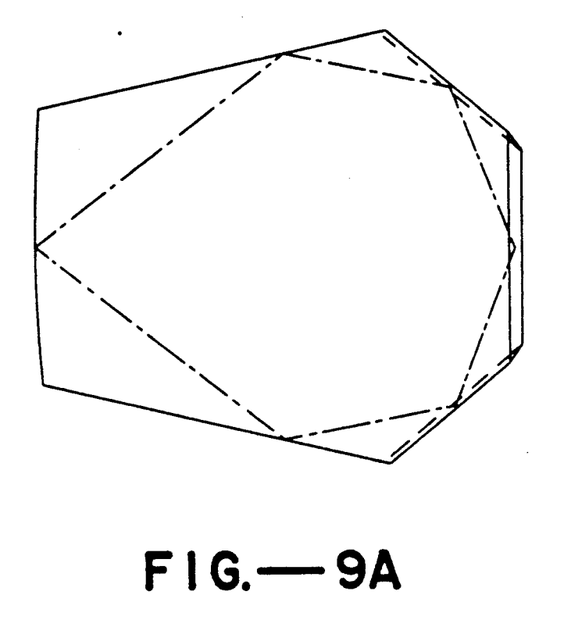
FIG. 9a is a top view of a monolithic NPRO device of a preferred embodiment.
Figure 9B:
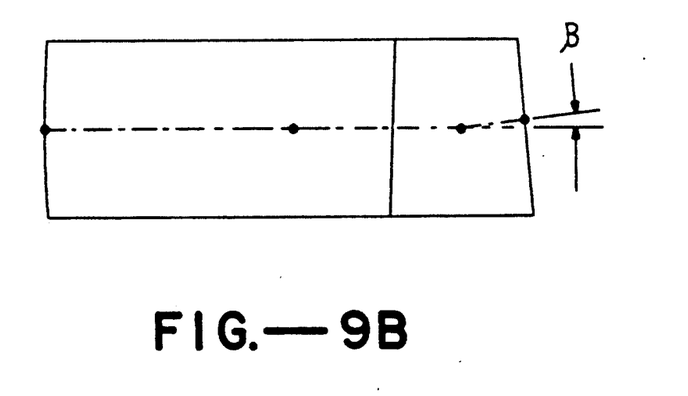

Referring to FIG. 2a–c, a light path of the preferred embodiment 20 is shown. A monolithic NPRO device 100 for propagating the light path of FIG. 2a–c is illustrated in FIGS. 9a and b. The only vertex that is not a total internal reflection is vertex A. The reflection at vertex A is the reflection from a multilayer dielectric coated mirror that forms part of the coupler 22. This mirror is preferably coated in such a way that the retardance associated with reflection from the mirror at the given angle of incidence is 180 degrees. This mirror is also coated so that its partial polarizer behavior approximates as nearly as possible the optimal choice for a partial polarizer in the equivalent optical diode. Vertices A, B, C, E and F are coplanar. Vertex D lies out of the plane of the other vertices. The light path has a plane of mirror symmetry that contains points A and F and is perpendicular to the plane of vertices A, B, C, E and F. A uniform magnetic field is applied substantially parallel to the line defined by vertex A and auxiliary point G, which lies in the plane of A, B, C, E and F. The light path traces the exterior of a three-dimensional figure described by the union of triangle ABF, trapezoid BCEF, and triangle CDE. The nonplanar fold angle $\beta$ and the angles of incidence at the vertices are chosen to produce the optimal optical diode in the monolithic NPRO and are determined by the following constraints.

General design algorithm for producing the optimal optical diode behavior

1) Total internal reflection must occur at vertices B,C,D,E and F, so the angles of incidence at each of these vertices must exceed the critical angle for the chosen medium, $\theta \text{critical} = \sin^{-1}(1/n)$, where n is the index of refraction of the medium.

2) Total internal reflection must not occur at vertex A, so the angle of incidence at A must be smaller than the critical angle for the chosen medium.

3) The sum of the TIR retardances for vertices B,C,D,E and F must be approximately 180 degrees.

4) The optical equivalent waveplate for one direction of propagation around the ring must have its principal axes aligned with the principal axes of the output coupler. When this alignment-of-principal-axes condition is satisfied, then the corresponding eigenpolarizations are the linear polarizations corresponding to the minimal loss and maximal loss directions of the partial polarizer. The laser will oscillate in the minimal loss state.

5) The optical equivalent waveplate for the other direction of propagation around the ring should be approximately a half-wave plate, and the principal axes of the optical equivalent waveplate should be rotated with respect to those of the output coupler by as large an angle as possible.

6) Given the orientation angle determined in (5), the optimal partial polarizer behavior that is desired for the output coupler can be chosen to maximize the loss difference between the two directions of propagation around the ring.

7) The exact solutions for any given case will depend on the index of refraction of the laser medium and the total amount of Faraday rotation available, which is itself a product of the Verdet constant of the medium, the strength of the magnetic field, and the overall length of the projection of the light path parallel to the applied magnetic field. In general there will be a range of possible angles of incidence at the output coupler that can still lead to optimal optical diodes, and there can be two optimal optical diode solutions for a given choice of the angle of incidence at the output coupler.

Figure 10A:
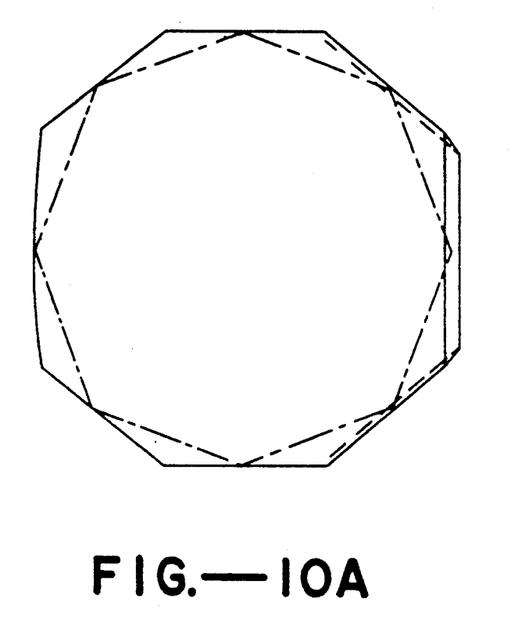
FIG. 10a is a top view of a monolithic NPRO device for propagating the eight reflection nonplanar ring light path of the preferred embodiment.
Figure 10B:
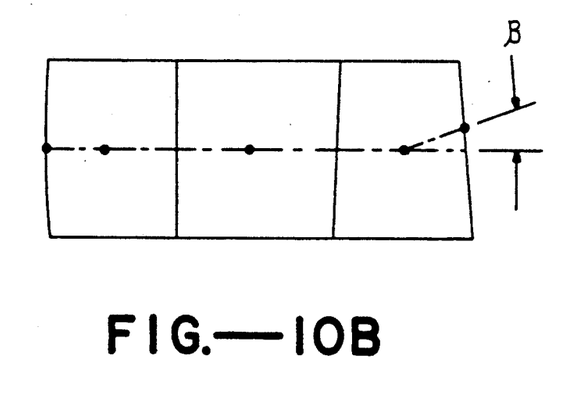

Referring to FIG. 3a–c, the preferred embodiment 30 for an eight-reflection nonplanar ring light path is shown. The same design algorithm used in connection with the six-reflection nonplanar ring light path 20 applies to the eight-reflection case 30 and its output coupler 32. A monolithic NPRO device 110 for propagating the eight reflection nonplanar ring light path of the preferred embodiment is illustrated in FIGS. 10a and b.

Alternative embodiment of symmetric nonplanar ring light paths

The preferred embodiments for the nonplanar ring light paths for six-reflection and eight-reflection monolithic NPROs are presented in FIGS. 2a–c and 3a–c. These preferred nonplanar ring light paths were chosen for their simplicity, but the fundamental idea of using six or eight reflections in the nonplanar ring light path in order to achieve a desired retardance sum for the reflections is the central goal. This goal can be realized (while still retaining the mirror symmetry of the nonplanar ring light path) by connecting reflection vertices in other ways. Moreover, the reflections need not be restricted to total internal reflections from bare interfaces. It may be equally well to consider reflections from nonpolarizing high reflectors produced by total internal reflection from coated surfaces or by multilayer dielectric coatings with such high reflectivity that their partial polarizer behavior becomes insignificant. The correct retardance sum for the reflections is the central goal, and this goal can be realized (while still retaining the mirror symmetry of the nonplanar ring light path) by connecting reflection vertices in other ways.

Figure 7A:
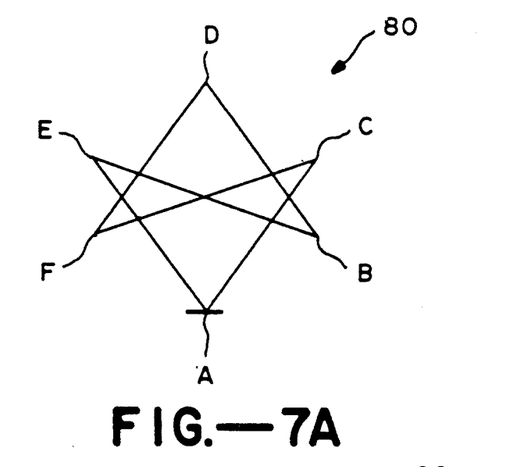
FIG. 7a illustrates a top view of another alternative preferred embodiment of the six reflection NPRO.
Figure 7B:
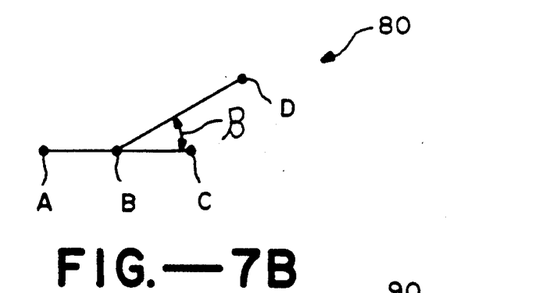
Figure 8A:
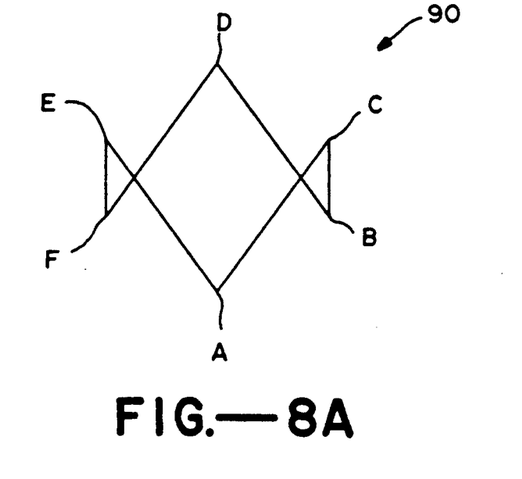
FIG. 8a illustrates a top view of yet another alternative preferred embodiment of the six reflection NPRO.
Figure 8B:
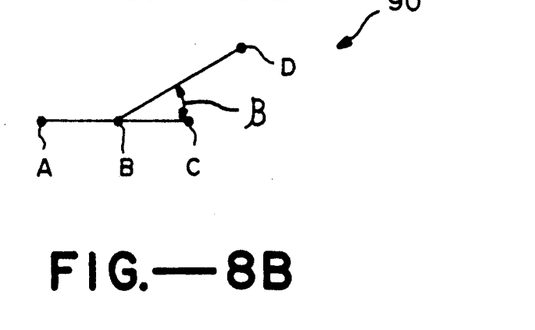

Referring to FIGS. 5, 6, 7 and 8, some possible alternative embodiments of the mirror-symmetric, six-reflection nonplanar ring light path 60, 62, 70–76, 80 and 90 are shown. Note that the nonplanar ring light paths are not restricted to involve only two planes of light propagation. For the symmetric six-reflection rings there can in general be three planes of propagation, because the light path can be folded along either line BF or along line CE or both (60 and 62 in FIG. 5). Some of these alternatives (FIGS. 7 and 8) will be difficult to implement in practice owing to the difficulty of producing total internal reflection at vertices B,C,D,E and F. Alternatives such as are illustrated in FIGS. 7 and 8 would require the use of nonpolarizing, highly reflecting coatings rather than the use of total internal reflection, because the angles of incidence in such folded ring paths become smaller than the critical angle of any currently available laser medium. In principle, however, they are all admissible candidates for a six-reflection monolithic NPRO in which the nonplanar ring light path contains a plane of mirror symmetry containing vertices A and D. The alternatives for the ways of connecting eight vertices are too numerous to display.

Means of producing the light path

There are many possible ways to construct monolithic resonators that will produce nonplanar ring light paths of the sort described herein. Since the fundamental concept is the nonplanar ring light path itself, no attempt has been made to describe all of the monolithic resonator geometries that could produce the desired light path. In accordance with the prior art, however, the use of appropriately oriented flat facets for all of the total internal reflections and the use of a curved facet for the output coupler (22 and 32) are one means of producing the indicated nonplanar ring light paths. Any monolithic geometry for the laser medium that can produce the above described nonplanar ring light path is within the scope of the present invention.

The previous discussion was restricted to monolithic NPROs in which the nonplanar ring light path has a plane of mirror symmetry and an output coupler that is presumed to produce a 180 degree phase shift on reflection. While these two features are highly desirable, neither feature is essential to establishing unidirectional operation in a monolithic NPRO. It is possible to design optimal optical diodes in monolithic NPROs in which the constraints of mirror symmetry and the 180 degree phase shift on reflection from the output coupler are relaxed. Therefore, included in the present invention are devices using 2N-reflection nonplanar ring light paths, where N is an integer greater than or equal to 3, involving 2N−1 total internal reflections and one reflection from an output coupler that serves as a partial polarizer.

Furthermore, the previous discussion was restricted to total internal reflection from bare interfaces in which the ambient medium is assumed to have an index of refraction of 1.0. Neither of these assumptions is essential. The fundamental criterion to satisfy is the criterion of the round trip phase shift sum. The phase shifts associated with the TIRs would be altered if thin film coatings were applied to one or more of the faces producing TIR, or if the ambient medium had an index of refraction greater than one. The principles of design presented herein would apply equally well to these alternatives once the true phase shifts associated with each reflection were known. As noted in connection with FIGS. 7 and 8, even highly reflecting mirror coatings on the various facets are acceptable, provided they do not act as significant partial polarizers. The fundamental retardance sum rule that must be satisfied in order to achieve optimal optical diode behavior generalizes to the following. The sum of the retardances occurring at all of the reflections that define the nonplanar ring light path (including the output coupler) must approximately equal an integer multiple of 360°.

Similar comments apply to the partial polarizer means incorporated into the monolithic NPRO. As presented in detail in "Eigenpolarization Theory of Monolithic Non-Planar Ring Oscillators," by Nilsson, et al., IEEE Journal of Quantum Electronics, Vol. 25 No. 4, Apr. 1989, pp. 767–90 there is a best value of the partial polarizer strength for optimal operation of an optical diode, but the means of producing such a partial polarizer are not discussed. In the preferred embodiment, the partial polarizer means is provided by the difference between the reflection coefficients for s and p polarized light, but other means might be employed with equal success.

Similarly, the discussion has emphasized six-reflection and eight-reflection monolithic NPROs, but all of the principles herein discussed apply directly to the case of 2N-reflection nonplanar ring light paths, where N is an integer greater than or equal to 2. Attention has been focused on the six and eight reflection cases because they are the nonplanar rings with the smallest total number of reflections that still allow optimal optical diode solutions for all of the technically important laser media, including both the low-index-of-refraction laser glasses and the high-index of refraction laser crystals. If an important laser medium with an index of refraction too small to admit optimal solutions with six or eight reflections should be developed, the natural choice would be the first admissible even-number-of-reflection nonplanar ring light path for use in a monolithic NPRO made from the new material.

The present invention presents the means of achieving the best optical diode behavior in a monolithic NPRO made from any currently available laser medium. The invention of the six-reflection nonplanar ring light path and the algorithm for producing optimal optical diode behavior enables for the first time the construction of unidirectional monolithic NPROs in laser glasses, whereas prior art showed no recognition of the importance of the index of refraction of the laser medium since it emphasized only the high-index, crystalline media (Nd:YAG and Nd:GGG). Even for media such as Nd:YAG and Nd:GGG, in which it is possible to achieve an optimal optical diode behavior using a four-reflection nonplanar ring light path, the six-reflection invention provides the advantage of realizing the same optical behavior with a smaller angle of incidence at the output coupler, thereby reducing the astigmatism of the device.

Presented herein is an analysis of how to achieve the best optical diode behavior in a four-reflection monolithic NPRO. Also, it is recognized that the use of the optical equivalent description of monolithic NPROs applies equally well to 2N-reflection NPROs. The use of the optical equivalent description allows the presentation of an algorithm for the design of optimal monolithic NPROs without actually solving for the details pertinent to each specific possibility.

In brief, the invention of the six-reflection and eight-reflection nonplanar ring light paths makes possible for the first time optimal unidirectional performance of monolithic NPROs in laser media with indices of refraction smaller than root 3. An additional benefit of the invention is the possibility of reducing the astigmatism of optimal monolithic NPROs with indices of refraction greater than root 3.

The foregoing descriptions of specific embodiments of the present invention have been presented for purposes of illustration and description. They are not intended to be exhaustive or to limit the invention to the precise forms disclosed; many obvious modifications and variations are possible in light of the above teaching. The embodiments were chosen and described in order to best explain the principles of the invention and its practical application, thereby enabling others skilled in the art to best utilize the invention and various embodiments with various modifications as are suited to the particular use contemplated. It is intended that the scope of the invention be defined by the claims appended hereto and their equivalents.

What is claimed is:

1. A monolithic nonplanar ring oscillator, comprising:
   an optically isotropic solid-state laser body having an index of refraction equal to or less than the square root of three for propagating laser radiation about a nonplanar ring path internal to said laser body and a coupler for input of pump radiation and output of a portion of said laser radiation from said laser body;
   six reflection means for defining said non-planar ring light path, said six reflection means including five internal reflection means and one reflection at said coupler;
   means for propagating said laser radiation about said ring light path so that said ring light path comprises six reflections, one at each of said six reflection means, said six reflection nonplanar ring light path being induced by the geometry of said laser body; and
   means for applying a magnetic field to said laser body to induce non-reciprocal polarization rotation;
   said non-planar geometry of said laser body inducing reciprocal polarization rotation, wherein said non-reciprocal and said reciprocal polarization rotations and a partial polarizer means positioned in said nonplanar ring light path combining to produce unidirectional wave oscillation of said laser radiation.

2. The monolithic nonplanar ring oscillator of claim 1 comprises means for inducing single frequency unidirectional traveling wave oscillation of said laser radiation, including partial polarizer means for producing high loss in one direction of propagation and low loss in the other direction of propagation of said light in said nonplanar ring path, said single frequency unidirectional oscillation being produced by the combined effects of said nonplanar ring path, the applied magnetic field and said partial polarizer means.

3. The monolithic nonplanar ring oscillator of claim 1 wherein the partial polarization means includes being located at said coupler.

4. The monolithic nonplanar ring oscillator of claim 1 further comprises:
   means for producing a large differential loss resonator with reduced astigmatism in media with index of refraction greater than square root of 3.

5. A monolithic nonplanar ring oscillator, comprising:
   a solid state laser body having an index of refraction equal to or less than the square root of three for propagating laser radiation about a nonplanar ring path internal to said laser body and a coupler for output of a portion of said emitted laser radiation from said laser body;
   2N reflection means, where N is an integer greater than 2, for defining said nonplanar ring path, said 2N reflection means including 2N-1 total internal reflection means and said coupler; and
   means for propagating said laser radiation about said nonplanar ring so that said light undergoes 2N reflections as it propagates around the nonplanar ring.

6. The monolithic nonplanar ring oscillator of claim 5 wherein said propagation means provides high differential loss while simultaneously providing unidirectional operation of said light ring in its lowest overall loss state.

7. The monolithic nonplanar oscillator of claim 6 wherein said coupler is a multilayer dielectric coated surface configured as a partial polarizer, thereby facilitating unidirectional propagation.

8. A monolithic nonplanar ring oscillator of claim 7 for propagating laser light about a nonplanar ring, said oscillator being fabricated out of a material having an index of refraction less than the square root of 3.

9. The monolithic nonplanar ring oscillator of claim 8 wherein the material is laser glass.

10. A monolithic nonplanar ring oscillator having 2N reflection means where N is an integer greater than 2 for propagating laser radiation internally around said ring oscillator, one of said reflection means being an output coupler, each of said reflection means having a retardance value, the sum of said retardance values being approximately equal to an integer multiple of 360°.

11. The monolithic nonplanar ring oscillator of claim 10 wherein the output coupler is a multi-layered dielectric coated outcoupler that functions as a partial polarizer.

12. The monolithic nonplanar ring oscillator of claim 11 wherein all of said reflections which are not at the output coupler are polarization independent high reflections.

13. A monolithic nonplanar ring oscillator having a plane of mirror symmetry containing a first vertex point that serves as an output coupler and a second opposing vertex point, said plane of mirror symmetry being perpendicular to a plane of incidence of said output coupler, said ring oscillator configured to establish a six reflection light path in which all but one of the reflections are total internal reflections, the remaining reflection being at said output coupler which is coated with a multilayer dielectric; the sum of the retardances at each of these reflections is approximately an integer multiple of 360°.

14. The monolithic nonplanar ring oscillator of claim 13 further comprises:
   means for applying a magnetic field; and
   a geometry such that an optical equivalent waveplate for one direction of propagation about said nonplanar ring light path has its principal axes aligned with the principal axes of said output coupler, and the sum of retardance of the optical equivalent waveplate in the direction opposite the direction of propagation and a retardance of the output coupler is approximately an integer multiple of 360°.

15. A monolithic nonplanar ring oscillator of claim 14 wherein the optically equivalent waveplate further comprises:
   partial polarizer and a rotation angle between the principal axes of a misaligned optical equivalent waveplate and the principal axes of the output coupler for maximizing the loss difference between the two directions of propagation in said nonplanar ring light path.

16. The monolithic nonplanar ring oscillator of claim 14 wherein the index of refraction of laser medium is smaller than root 3.

17. The monolithic nonplanar ring oscillator of claim 16 wherein the laser medium is laser glass.

18. The monolithic nonplanar ring oscillator of claim 14 wherein the laser medium is Nd:YAG and the angle of incidence on the output coupler is smaller than 28.14°.

19. The monolithic nonplanar ring oscillator of claim 14 wherein the laser medium is Nd:GGG and the angle of incidence on the output coupler is smaller than approximately 21.4°.

20. A monolithic nonplanar ring oscillator embodied in a material having an index of refraction less than the square root of three and having 2N reflection means, where N is an integer greater than 2 for defining a 2N reflection nonplanar ring light path; at least one of said 2N reflection means being a polarization independent high reflector and at least one of said 2N reflection means being an output coupler.

21. A method for a monolithic nonplanar ring oscillator, comprising the steps of:
  providing a solid-state laser body of material having an index of refraction less than the square root of three for propagating a laser light about a ring internal to said laser body and a coupler for output of a portion of said light from said laser body;
  propagating said laser light about 2N reflection means, so that said laser light undergoes 2N reflections as it propagates around said ring, where N is an integer greater than 2, said 2reflection means including 2N − 1 total internal reflection means and said coupler.

22. The method of claim 21 for a monolithic nonplanar ring oscillator wherein said 2N reflection propagation step further comprises providing high differential loss while simultaneously providing unidirectional operation of said light ring in its lowest overall loss state.

23. A method for a monolithic nonplanar ring oscillator comprising the steps of:
  propagating laser radiation within a laser body about a six reflection nonplanar ring light path, said six reflections including five total internal reflections and one reflection at an output coupler, inducement of said six reflection nonplanar ring light path being facilitated by the geometry of said laser body;
  applying a magnetic field to said laser body to induce non-reciprocal polarization rotation, said nonplanar ring light path inducing reciprocal polarization rotation, applying said magnetic field in combination with said nonplanar ring light path and a partial polarizer located in said ring light path to create unidirectional wave oscillation in said laser radiation;
  providing an optical equivalent waveplate for one direction of propagation that has its principal axes aligned with the principal axes of said output coupler, the sum of the retardance of said optical equivalent waveplate for the direction opposite of propagation and the retardance of said output coupler being approximately an integer multiple of 360°.

24. The method for a monolithic nonplanar ring oscillator of claim 23 further comprises the step of:
  providing said output coupler which has a partial polarizer strength based on a rotation angle between the principal axes of a misaligned optical equivalent waveplate and a principal axes of the output coupler in order to maximize the loss difference between the two directions of propagation.

25. The method for a monolithic nonplanar ring oscillator of claim 24 further comprises the step of:
  reducing astigmatism in media with index of refraction greater than square root of 3.

26. The method for a monolithic nonplanar ring oscillator of claim 23 further comprises the step of:
  producing said laser radiation in a material having an index of refraction less than square root 3.

* * * * *